US010469431B2

(12) United States Patent
Arbajian et al.

(10) Patent No.: US 10,469,431 B2
(45) Date of Patent: Nov. 5, 2019

(54) COGNITIVE MESSAGE ACTION RECOMMENDATION IN MULTIMODAL MESSAGING SYSTEM (71) Applicant: INTERNATIONAL BUSINESS MACHINES CORPORATION, Armonk, NY (US)

(72) Inventors: Pierre E. Arbajian, Matthews, NC (US); James R. Kraemer, Santa Fe, NM (US); Jeb R. Linton, Manassas, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 390 days.

(21) Appl. No.: 14/976,964

(22) Filed: Dec. 21, 2015

(65) Prior Publication Data
US 2017/0180298 A1 Jun. 22, 2017

(51) Int. Cl.
G06F 15/16 (2006.01)
H04L 12/58 (2006.01)
H04L 29/08 (2006.01)
H04W 4/02 (2018.01)
H04W 4/12 (2009.01)

(52) U.S. Cl.
CPC .............. *H04L 51/26* (2013.01); *H04L 51/02* (2013.01); *H04L 51/22* (2013.01); *H04L 67/18* (2013.01); *H04L 67/22* (2013.01); *H04W 4/023* (2013.01); *H04W 4/12* (2013.01)

(58) Field of Classification Search
CPC ......... H04L 51/26; H04L 51/22; H04L 67/22; H04L 51/02; H04L 67/18; H04W 4/023; H04W 4/12
See application file for complete search history.

(56) References Cited

U.S. PATENT DOCUMENTS

| | | | | |
|---|---|---|---|---|
| 7,289,964 | B1 * | 10/2007 | Bowman-Amuah | ........................ G06F 9/5038 705/1.1 |
| 7,783,715 | B2 * | 8/2010 | Muller | .................... H04L 51/22 709/206 |
| 7,844,666 | B2 * | 11/2010 | Horvitz | ................ G06Q 10/107 709/206 |
| 8,086,672 | B2 * | 12/2011 | Horvitz | ................ G06Q 10/107 709/206 |
| 8,312,096 | B2 * | 11/2012 | Cohen | .................. H04L 12/587 345/168 |

(Continued)

Primary Examiner — Moustafa M Meky
(74) Attorney, Agent, or Firm — Cantor Colburn LLP; David Zwick (57) ABSTRACT Technical solutions are described for action recommendation in a multimodal messaging system. An example method includes accessing a prior message received by a user. The method also includes identifying a first set of attributes associated with the prior message. The method also includes identifying a prior action selected by the user in response to the prior message. The method also includes receiving a new message directed for the user. The method also includes identifying a second set of attributes associated with the new message. The method also includes generating a list of recommended actions in response to the new message based on a comparison of the first set of attributes and the second set of attributes. The method also includes presenting the list of recommended actions to the user.

20 Claims, 7 Drawing Sheets (56) References Cited

U.S. PATENT DOCUMENTS

| | | | | |
|---|---|---|---|---|
| 8,417,782 | B2* | 4/2013 | Tendjoukian | G06Q 10/109 709/204 |
| 8,645,973 | B2* | 2/2014 | Bosworth | H04L 67/10 719/320 |
| 8,701,014 | B1* | 4/2014 | Schlegel | H04L 51/22 715/741 |
| 8,701,027 | B2* | 4/2014 | van Dantzich | G06F 3/0482 715/768 |
| 8,930,481 | B2* | 1/2015 | Zhang | H04L 51/02 709/206 |
| 8,935,190 | B2* | 1/2015 | Amoroso | G06Q 10/107 706/46 |
| 9,076,146 | B2* | 7/2015 | Feng | G06Q 10/00 |
| 9,363,213 | B2* | 6/2016 | Bernstein | G06Q 10/107 |
| 9,438,648 | B2* | 9/2016 | Asenjo | H04L 65/403 |
| 9,491,249 | B2* | 11/2016 | Rosenshine | H04M 3/42382 |
| 9,577,972 | B1* | 2/2017 | Word | H04L 51/26 |
| 9,591,086 | B2* | 3/2017 | Brezina | H04M 15/00 |
| 9,591,101 | B2* | 3/2017 | Word | H04L 67/42 |
| 9,614,804 | B2* | 4/2017 | Myles | H04L 51/22 |
| 9,614,807 | B2* | 4/2017 | Spivack | H04L 51/32 |
| 9,706,398 | B2* | 7/2017 | Frederick | H04W 12/06 |
| 9,716,764 | B2* | 7/2017 | Brezina | H04L 67/22 |
| 9,800,679 | B2* | 10/2017 | Hein | H04L 67/22 |
| 9,819,633 | B2* | 11/2017 | Root | H04L 51/32 |
| 9,825,896 | B2* | 11/2017 | Snider | H04L 51/26 |
| 2005/0228774 | A1* | 10/2005 | Ronnewinkel | G06F 16/353 |
| 2010/0153325 | A1* | 6/2010 | Amoroso | G06Q 10/107 706/46 |
| 2015/0089007 | A1* | 3/2015 | Amoroso | G06Q 10/107 709/206 |
| 2016/0330597 | A1* | 11/2016 | Kalkounis | G06F 17/276 |

* cited by examiner

COGNITIVE MESSAGE ACTION RECOMMENDATION IN MULTIMODAL MESSAGING SYSTEM

BACKGROUND

The present application relates to communication systems, and more specifically, to generating an automated response to a message.

A user may receive an overwhelming volume of messages from multitudes of sources and of a variety of quality and importance. The volume of messages makes it difficult for the reader to read all messages, keep track of related 'to-dos', and remember to take note. Further it is difficult for the user to respond to the messages in a timely manner and as appropriate to the messages that demand action while considering the urgency and relevance of messages demanding action.

SUMMARY

According to an embodiment, a computer implemented method for action recommendation in a multimodal messaging system includes accessing a prior message received by a user. The computer implemented method also includes identifying a first set of attributes associated with the prior message. The computer implemented method also includes identifying a prior action selected by the user in response to the prior message. The computer implemented method also includes receiving a new message directed for the user. The computer implemented method also includes identifying a second set of attributes associated with the new message. The computer implemented method also includes generating a list of recommended actions in response to the new message based on a comparison of the first set of attributes and the second set of attributes. The computer implemented method also includes presenting the list of recommended actions to the user.

An attribute of a message, which is in the first set of attributes and the second set of attributes, is one of a sender of the message, a time of receipt of the message, a time of transmission of the message, a location of receipt of the message, and text within the message. The method further includes, selecting an action to add to the list of recommended actions based on a location of receipt of the new message, where the action is selected based on said action taken by the user in response to the prior message, and the prior message being received by the user in vicinity of the location of receipt of the new message. The method further includes, adding an action to respond to the new message using a first messaging client in response to the new message being received using a second client, where the action to respond to the new message using a first messaging client is selected based on the user responding to the prior message via the first client and the prior message being received via the second client. The list of recommended actions is generated based on a mapping between an action taken by the user in response to a received message and attributes of the received message. The method further includes receiving, from the user, a selection of an action from the list of recommended actions in response to the new message. The method may also include updating the mapping according to the selected action and the second set of attributes associated with the new message.

According to another embodiment, a response recommendation system includes a memory, and a processor. The processor accesses an archive of prior messages. The processor also identifies message attributes associated with each respective prior message from the archive. The processor also identifies a prior action taken in response to the each respective prior message. The processor also determines a mapping between message attributes and actions. The processor also identifies a set of message attributes associated with a new message directed to a user. The processor also generates a list of recommended actions in response to the new message based on the mapping and the set of message attributes. The processor also presents the list of recommended actions to the user.

According to another embodiment, a computer program product for recommending actions in response to incoming messages includes a computer readable storage medium. The computer readable storage medium includes computer executable instructions to access an archive of prior messages. The computer readable storage medium also includes computer executable instructions to identify message attributes associated with each respective prior message from the archive. The computer readable storage medium also includes computer executable instructions to identify a prior action taken in response to the each respective prior message. The computer readable storage medium also includes computer executable instructions to determine a mapping between message attributes and actions. The computer readable storage medium also includes computer executable instructions to identify a set of message attributes associated with a new message directed to a user. The computer readable storage medium also includes computer executable instructions to generate a list of recommended actions in response to the new message based on the mapping and the set of message attributes. The computer readable storage medium also includes computer executable instructions to present the list of recommended actions to the user.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Disclosed here are technical solutions for treating a received message based on message attributes and generating a cognitive prioritized workflow based on an action plan. The technical solutions further facilitate notifying a user to whom the message is directed and presenting the user with a list of recommended actions based on the prioritized workflow. The technical solutions described herein generate the prioritized workflow based on previous actions taken by the user in response to previous messages that have attributes similar to those of the message received. The message received may be an email, an instant message (such as via a messaging service like WHATSAPP™, YAHOO MESSENGER™ or the like), a social media message (such as from a microblog such as TWITTER™, a social media service such as FACEBOOK™ LINKEDIN™, SNAPCHAT™ or the like), a text message (such as via a short messaging service (SMS)), or any other form of communication. The technical solutions facilitate identifying a response to the received message based on analysis of attributes of an archive of previous messages, which may include any of the above types of messages. The analysis of the archived messages may be performed using machine learning techniques to identify the user's preferred response to a message that is associated with a set of attributes which includes, message content, a sender, a messaging system, a location, a time, and the like.

Figure 1:
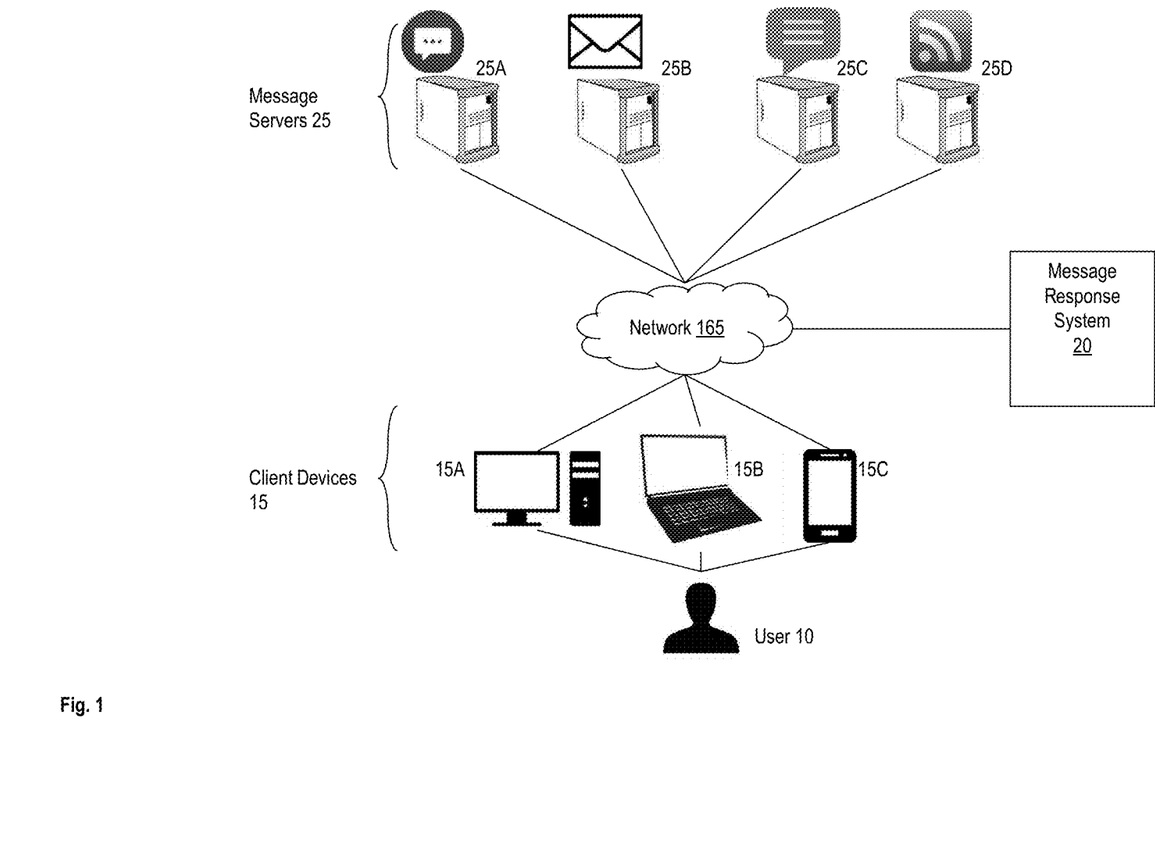
FIG. 1 illustrates an example message response system in accordance with an embodiment.

FIG. 1 illustrates an example message response system 20. The message response system 20 communicates with one or more message servers 25 via a communication network 165. The message response system 20 may communicate with one or more client devices 15 via the network 165. The client devices 15 may facilitate a user 10 to send/receive a message via the network 165 to/from the message servers 25. The message servers 25 facilitate routing the message to a recipient of the message. A unique identifier, such as a number, a username, or any other form of user-identifier, may identify the recipient. The message servers 25 may parse the unique identifier from the message, such as from a header of the message. The message may be any form of an electronic communication message, such as an email, an instant message, a text message, a voice message, an image, or a combination thereof. The message may contain text, images, voice, or any other type of content. The sender of the message may determine the messaging service to use when sending the message. For example, the messaging service may identify an email provider, an instant messaging provider, a text message provider, a voice message provider, a social media platform provider, a microblog platform, a web-based forum, or any other type of messaging service provider.

Depending on the messaging service provider, a different message server from the messaging servers 25 routes the message. For example, the message servers 25 include a server corresponding to respective messaging service providers. For example, a first message server 25A may be an email server, a second message server 25B may be an instant message server, a third message server 25C may be a text message provider, a fourth message server 25D may be a social media message server, and so on. Of course, in an example, a message server 25A from the message servers 25 may facilitate routing one or more types of messages. For example, a message server may facilitate routing an email as well as an instant message, or any other combination of the message types. Further, in another example, the message servers 25 may include other types of message servers and/or more/fewer message servers than illustrated.

Figure 2:
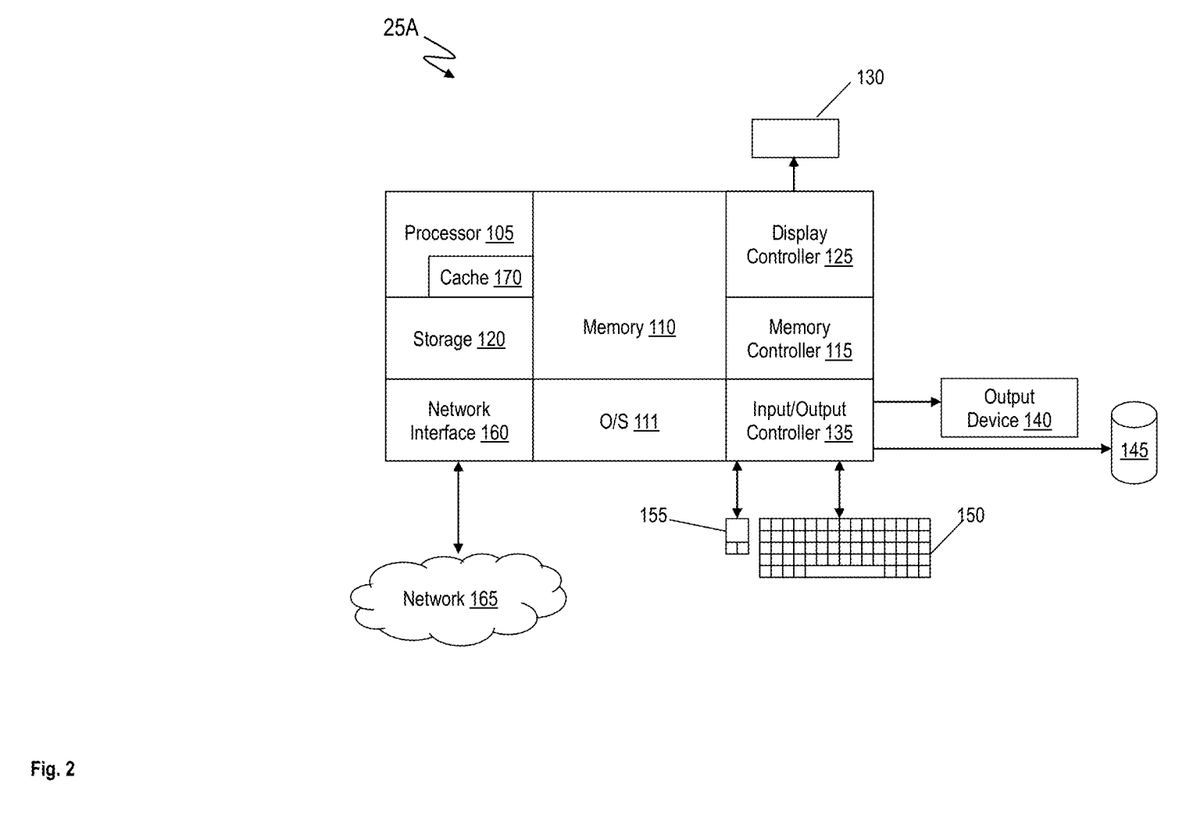
FIG. 2 illustrates components of an example message server in accordance with an embodiment.

FIG. 2 illustrates components of an example message server 25A from the message servers 25. The message server 25A may be a computer server that includes hardware and electronic circuitry, such as a computer readable memory and processor that executes computer executable instructions. The message server 25A may be a distributed server, a server cluster, or any other type of server. The message server 25A may be a communication apparatus, or any other device that communicates via the network 165.

The message server 25A includes, among other components, a processor 105, memory 110 coupled to a memory controller 115, and one or more input devices 145 and/or output devices 140, such as peripheral or control devices, that are communicatively coupled via a local I/O controller 135. These devices 140 and 145 may include, for example, battery sensors, position sensors, indicator/identification lights and the like. Input devices such as a conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the message server 25A, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, and so on.).

The memory 110 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The message server 25A may further include a display controller 125 coupled to a user interface or display 130. In some embodiments, the display 130 may be an LCD screen. In other embodiments, the display 130 may include a plurality of LED status lights. In some embodiments, the message server 25A may further include a network interface 160 for coupling to a network 165. The network 165 may be an IP-based network for communication between the message server 25A and an external server, client and the like via a broadband connection. In an embodiment, the network 165 may be a satellite network. The network 165 transmits and receives data between the message server 25A and external systems. In some embodiments, the network 165 may be a managed IP network administered by a service provider. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

The user 10 may interact with the message servers 25 from one or more types of client devices 15. For example, the user 10 receives the message via the message servers 25 at one or more of the client devices 15. The user 10 further composes and sends the message from one or more of the client devices 15 to one or more of the message servers 25, and directed to one or more recipients of the message. For example, the client devices 15 may include communication apparatus such as a desktop computer, a laptop computer, a phone, a tablet computer, a smartphone, a smartwatch, or any other communication apparatus that communicates over the communication network 165. In an example, the user 10 receives the message via one or more of the client devices. For example, the user 10 receives an email via a first client device 15A, which may be a desktop computer, via a second client device 15B, which may be a laptop computer, and a third client device 15C, which may be a smartphone. Of course, in another example, the user 10 may receive the message on more/fewer number of client devices 15. Alternatively or in addition, the client devices 15 may be of different type than those illustrated. Further, the first client device 15A may facilitate the user 10 to send/receive more than one type of message. For example, the user 10 may send an email message, an instant message, a social media message, and any other type of message via the first client device 15A. The user 10, in an example, may receive the message via the client device 15A and in response may take a user action via the third client device 15C. For example, the user 10 receives an email message via the first client device 15A and in response the user 10 may send a text message via the third client device 15C. In other examples, the user 10 may receive a different type of message and may send a different type of message in response than those described in the above example.

Figure 3:
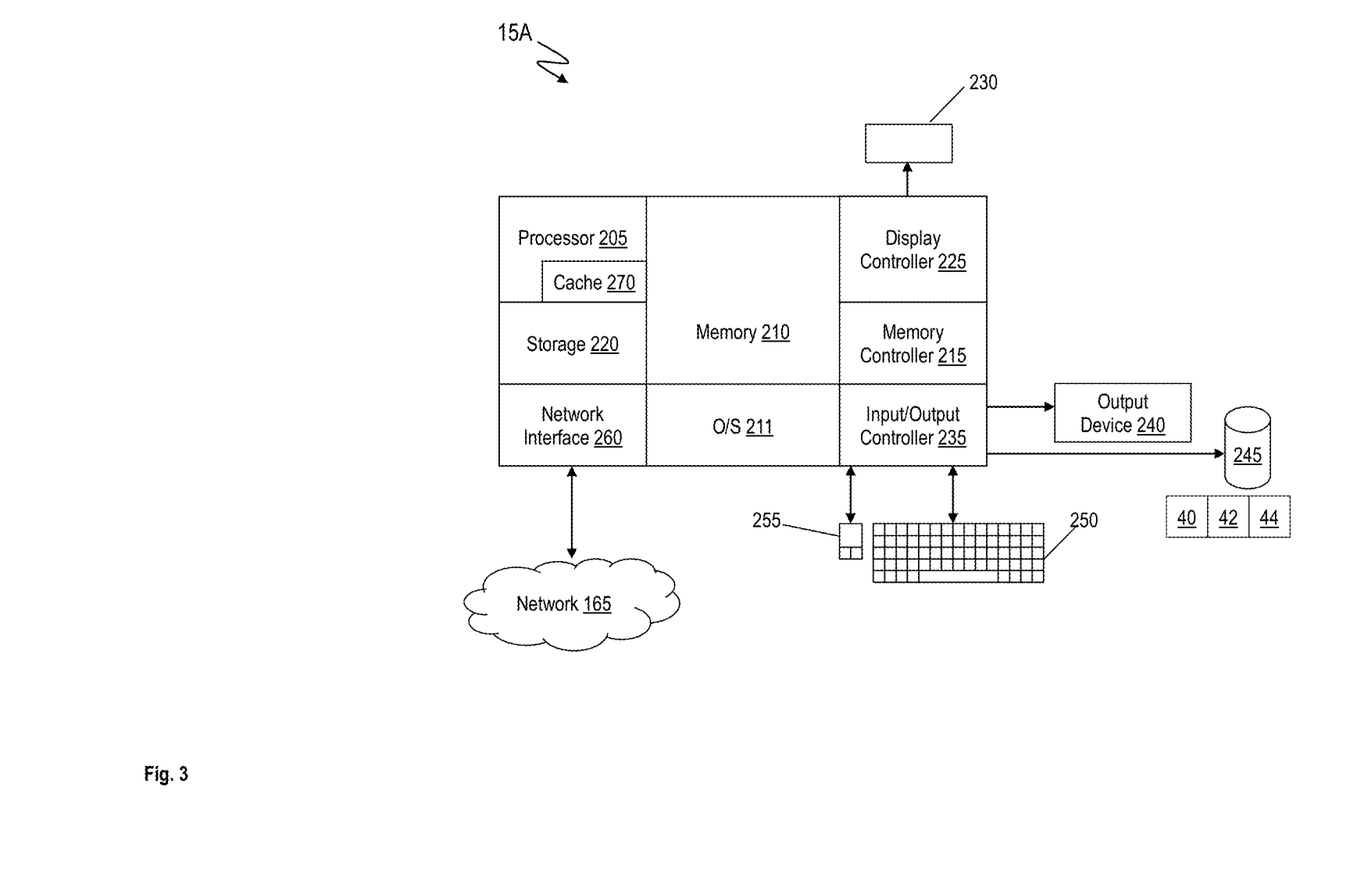
FIG. 3 illustrates components of an example client device in accordance with an embodiment.

FIG. 3 illustrates components of the example client device 15A from the client devices 15. The client device 15A may be a computer server that includes hardware and electronic circuitry, such as a computer readable memory and processor that executes computer executable instructions. The client device 15A may be a communication apparatus, or any other device that communicates via the network 165.

The client device 15A includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 may include, for example, battery sensors, position sensors (altimeter 40, accelerometer 42, global positioning signal receiver 44), indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the client device 15A, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods of this disclosure.

The client device 15A may further include a display controller 225 coupled to a user interface or display 230. In some embodiments, the display 230 may be an LCD screen. In other embodiments, the display 230 may include a plurality of LED status lights. In some embodiments, the client device 15A may further include a network interface 260 for coupling to the network 165.

The message response system 20 is a communication apparatus that communicates with the message servers 25 and/or the client devices 15 to generate a list of user actions for the user 10 in response to the message that the user 10 received. The message response system 20 may be a communication apparatus, such as a computer. For example, the message response system 20 may be a desktop computer, a tablet computer, a laptop computer, a phone, such as a smartphone, a server computer, or any other device that communicates via the network 165. The message response system 20 includes hardware, such as electronic circuitry. In an example, as illustrated the message response system 20 is a separate, standalone apparatus. In another example, the message response system 20 may be part of one of the message servers 25. In yet another example, the message response system 20 is part of one of the client devices 15. Alternatively or in addition, the message response system 20 may be a distributed system that partially exists on the message servers 25 and/or the client devices 15. The message response system 20, in an example, may be a computer program product that is part of the one or more message servers 25 or the one or more client devices 15.

Figure 4:
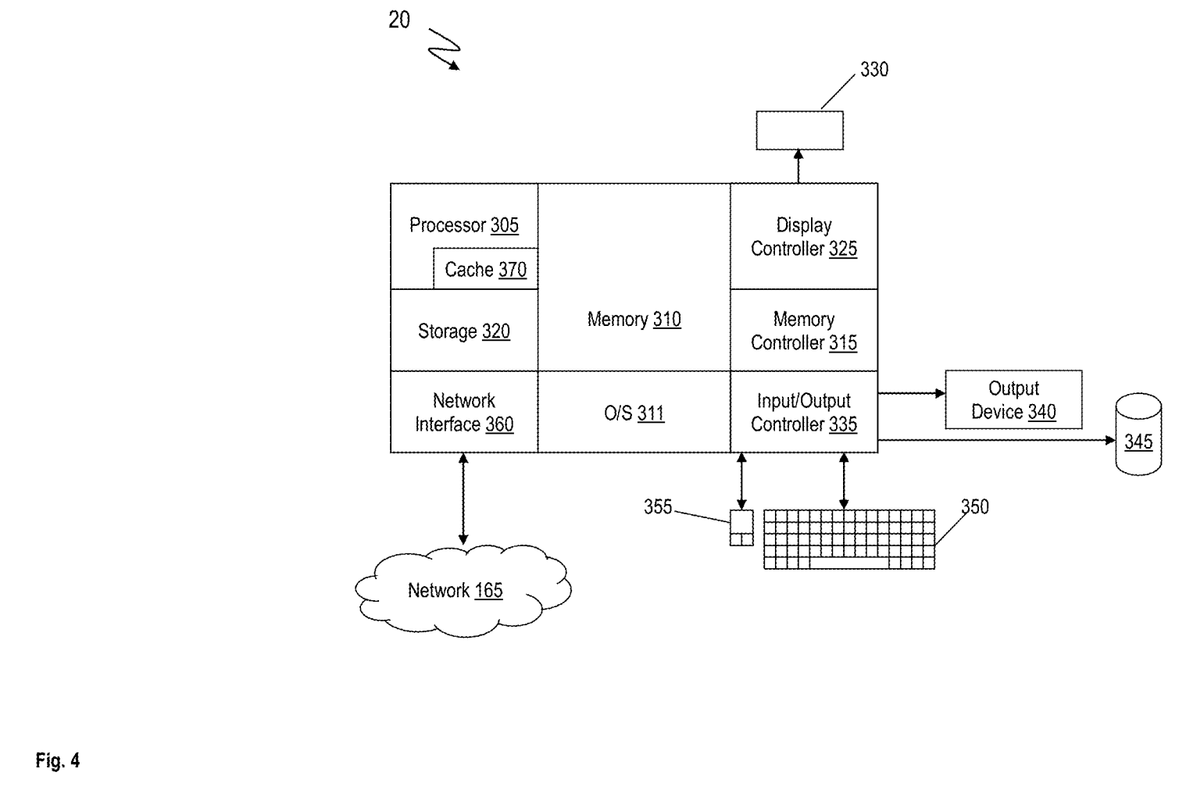
FIG. 4 illustrates components of an example message response system in accordance with an embodiment.

FIG. 4 illustrates components of the example message response system 20. The message response system 20 includes, among other components, a processor 305, memory 310 coupled to a memory controller 315, and one or more input devices 345 and/or output devices 340, such as peripheral or control devices, that are communicatively coupled via a local I/O controller 335. These devices 340 and 345 may include, for example, battery sensors, position sensors, indicator/identification lights and the like. Input devices such as a conventional keyboard 150 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the message response system 20, a semiconductor based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, and so on.).

The memory 310 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 2, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid state drive. The stored instructions in memory 310 or in storage 320 may include those enabling the processor to execute one or more aspects of the systems and methods of this disclosure.

The message response system 20 may further include a display controller 325 coupled to a user interface or display 330. In some embodiments, the display 330 may be an LCD screen. In other embodiments, the display 330 may include a plurality of LED status lights. In some embodiments, the message response system 20 may further include a network interface 360 for coupling to the network 165.

Figure 5:
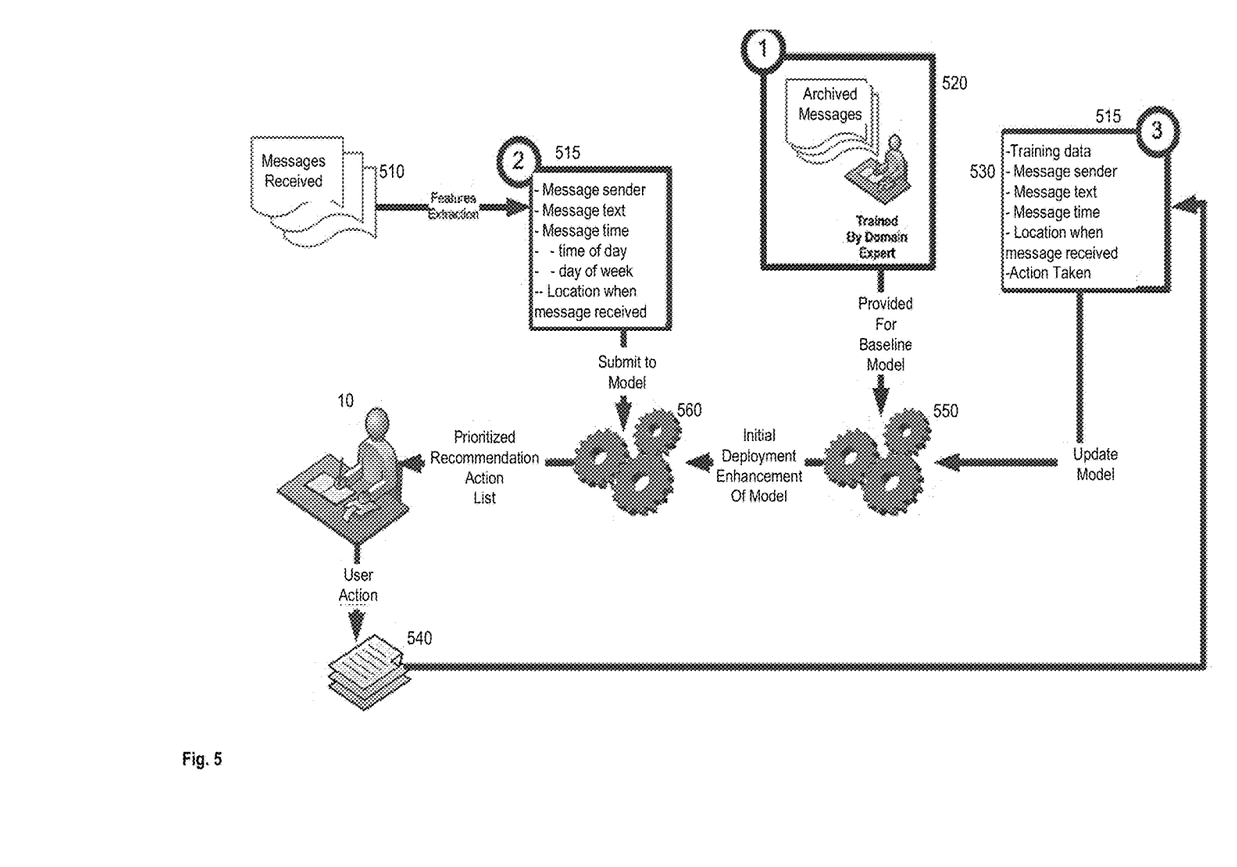
FIG. 5 illustrates an example workflow of the message response system in accordance with an embodiment.

FIG. 5 illustrates an example workflow of the message response system 20. In an example, the workflow is operated according to computer executable logic embedded in the message response system 20, such as via computer executable instructions. According to the workflow, the message response system 20 learns how to respond to a one or more incoming messages 510 based on message content and other attributes such as sender, messaging service, time, location, and the like and prior user action in response to prior messages with similar attributes. In an example, the learning may include using machine learning techniques based on a set of archived messages 520 to train the message response system 20 to emulate the user's responses. The message response system 20 may further track the user actions in response to the incoming messages 510. In an example, the message response system 20 may track the user actions for a predetermined learning period to track a pattern of user actions in response to messages with associated with specific attributes. The message response system 20 applies the pattern to new message(s) received and generates a list of user actions 540 as a recommended list of actions for the user 10 to take in response to the new message(s) received. Thus, based on the learning process the message response system 20 provides cognitive message response recommendations by analyzing multitudes of messages received by the user 10 via one or more of the client devices 15 from one or more messaging services.

In an example, the message response system 20 may be used in a business communications environment and can be configured to be organization or domain sensitive. Accordingly, at deployment, the message response system 20 may track user actions to incoming messages 510 and archived messages 520 that are associated with a specific company or domain, for example. Alternatively or in addition, different attributes of the messages maybe used as a training data 530 to track the user actions. In an example, the message response system 20 may be configured to respond a predetermined manner. For example, the initial configuration may be based on actions of different users to the archived messages 520. The responses used for the initial configuration may be from different users that are on the same domain or from the same organization as the user 10. The message response system 20 may generate the list of recommended user actions 540 according to the initial configuration, and in addition monitor the actions taken by the user 10 in response to the incoming messages 510. Thus, the message response system 20 may update the initial configuration according to the actions of user 10. Alternatively, the message response system 20 may generate a second configuration to respond to incoming messages 510 that is personalized for the user 10. For example, after a certain amount of analysis, such as after a predetermined duration since deployment, or after tracking a predetermined number of user actions, the message response system 20 may be considered personalized enough. Once personalized, the message response system 20 may generate the list of recommended user actions 540 to the user 10 according to the second configuration.

In an example, the message response system 20 provides the list of recommendations of user actions 540 that the user 10 confirms or dismisses. Alternatively or in addition, the message response system 20 creates a management plan for the incoming messages 510 that the user 10 edits. The message response system 20 keeps track of the user actions that the user 10 selected from the list of recommended user actions 540 and further updates the configurations for future recommendations. In an example, the message response system 20 also tracks information such as duration of user action and completion date of the user action.

Figure 6:
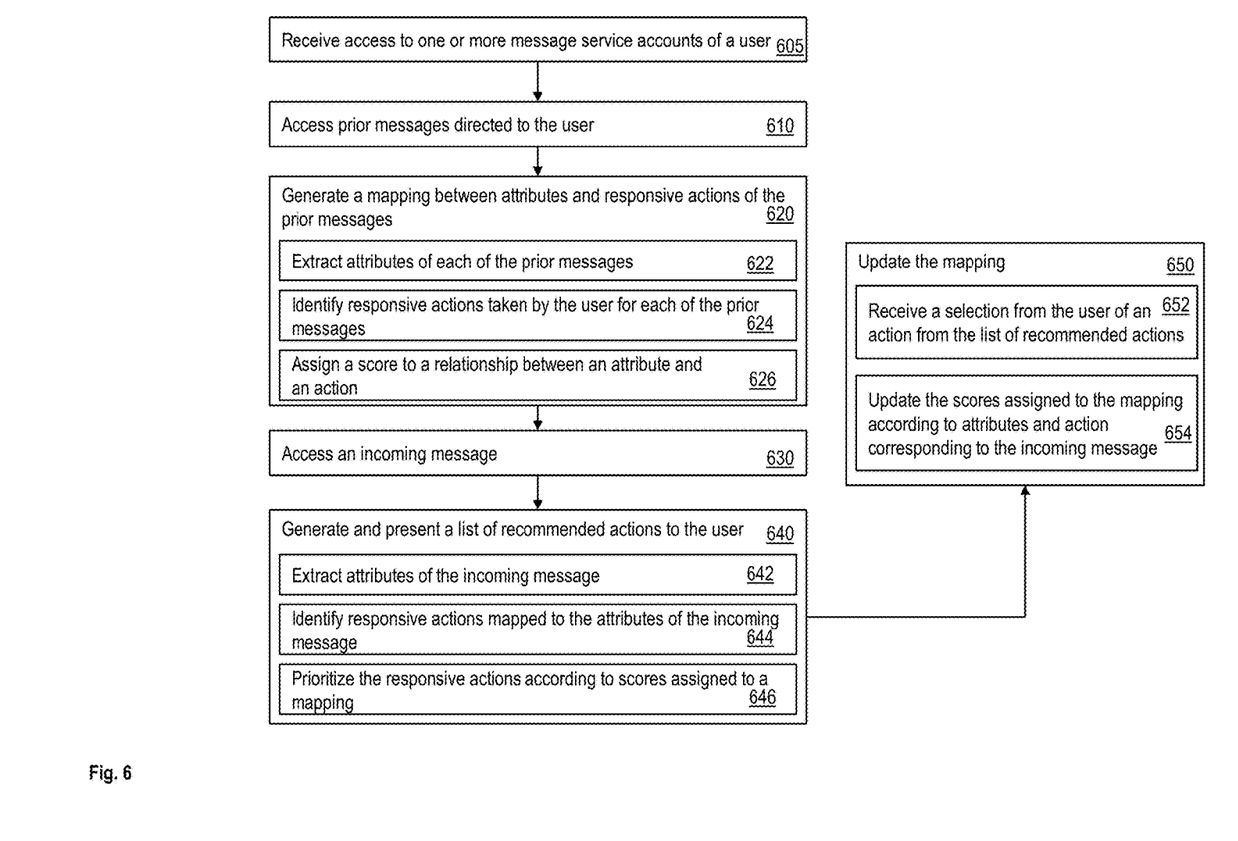
FIG. 6 illustrates a flowchart for an example method for action recommendation in a multimodal messaging system in accordance with an embodiment.

FIG. 6 illustrates a flowchart for an example method for action recommendation in a multimodal messaging system. The multimodal messaging system refers to the user 10 accessing messages from more than one type of message service as described. In an example, the message response system 20 implements the method. The message response system 20 receives access to one or more message service accounts of the user 10, as shown at block 605. For example, the user 10 identifies which messaging sources to monitor with the message response system 20, such as IBM VERSE™, FACEBOOK™, TWITTER™, LINKEDIN™, text messaging, WHATSAPP™, and so on. For example, the user 10 may provide login credentials, such as a username/password combination, for the one or more messaging services to which the user 10 subscribes. The message response system 20 accesses prior messages directed to the user 10, as shown at block 610. In an example, the message response system 20 accesses the prior messages from the message servers 25 corresponding to the messaging services to which the user 10 provided access.

The message response system 20 generates a mapping between attributes and responsive actions of the prior messages, as shown at block 620. For example, the message response system 20 extracts attributes of each of the prior messages, as shown at block 622. The message response system 20 further identifies responsive actions taken by the user 10 for each of the prior messages, as shown at block 624. The message response system 20 maps the responsive action of a prior message with the attributes of the prior message. Accordingly, the message response system 20 identifies a relationship between a message attribute and a user action. In an example, based on the mapping based on the prior messages, the message response system 20 assigns a score to the relationship between the message attribute and the user action, as shown at block 626. The assigned score may be a numeric value, such as 10, 20 or any other number that is updated each time the user 10 takes the corresponding action in response to the received message matching the attributes.

The relationship may be between a single message attribute and a user action, or a combination of message attributes and a user action. The message response system 20 may update the score by a default value irrespective of the corresponding message attributes. Alternatively, the message response system 20 may update the score according to a weighted incremental value assigned to each message attribute or a combination of message attributes. In an example, the user 10 may assign the incremental values. For example, a sender may have a higher incremental value (for example 5) than an incremental value (for example 2) for a location or receipt of the message. In another example, a combination of the sender and location of receipt of the message may have a higher incremental value (such as 10) than the incremental values of the sender and the location individually, or a sum of those attributes. The message attributes and incremental values described herein are just exemplary, and it will be obvious to a person skilled in the art that other message attributes or combinations thereof may be used and assigned different incremental values (or weights) in different examples.

In an example, the message response system 20 may generate such a mapping between the message attributes and the user actions as part of a training mode, which may be for a predetermined period of time, which may be referred to as "acclimation" period.

The acclimation period may be a predetermined duration of time or a predetermined number of prior messages or user actions. During the acclimation period, the message response system 20 reviews the incoming messages and user actions in response to the incoming messages. Further, during the acclimation period, the message response system 20 reviews the attributes of the incoming messages as well as the content of the messages. In an example, as illustrated the message response system 20 reviews the messages and assigns the scores to the relationships between message attributes and the user actions for each respective user. In another example, the message response system 20 assigns the scores for a group of users, such as users from the same organization, users that have the same domain, or any other grouping of the users. Thus, the message response system 20, using machine-learning techniques, monitors the user actions to prior messages and generates a mapping between message attributes and the user actions.

Some of the criteria/attributes that the message response system 20 uses to assign scores to the relationships may include a message sender identity. For example, the message response system 20 may assign (and increment) a score to a relationship between a specific sender of a message and a user action that the user 10 takes in response to the message from the specific sender. For example, the user 10 may delete a message from a sender 'X'. In this case, the message response system 20 assigns a score to the relationship between the attribute 'sender=X' and the user action 'delete message'. If the user 10 deletes another message from X, the message response system 20 increments the score to the relationship between X and 'delete message'.

The message response system 20 may further determine and score a relationship between a text analysis of the content of the message and the responsive user action. The message response system 20 thus correlates textual content of the message and the user action. For example, the message response system 20 may note that the user 10 immediately replies to a message that includes the word 'urgent'. Accordingly, the message response system may map a relationship between the message attribute of 'textual content=urgent' and a user action 'reply to the message'. The message response system 20, as described above, assigns and increments a score for the relationship based on a number of times the user 10 replies immediately to incoming messages. In this context 'immediately' may be within a predetermined duration since viewing the message, such as within five minutes, one hour, one day, or any other predetermined duration corresponding to 'immediate'.

In a similar manner, the message response system 20 assigns and updates scores of the relationships that map the user actions with message attributes such as a message source, a time of day of receipt of the message, a day of week of receipt of the message, a domain (Personal, Work related) of receipt of the message, and the like. The message attributes that the message response system 20 identifies may further include a time of receipt of the message, a time of transmission of the message, a location of receipt of the message, text within the message, or the like. The message attributes identified may further include a domain from which the message is sent, a domain at which the message is received, a client device used for sending the message, a client device used for viewing the message, an internet protocol (IP) address of the sender of the message, and the like. The message response system 20 extracts the message attributes from a header and/or body of the message.

The message response system 20 uses the mapping to generate and present a list of recommended actions to the user 10 in response to an incoming message, as shown at blocks 630 and 640. For example, the message response system 20 extracts attributes of the incoming message, as shown at block 642. The message response system 20 further identifies one or more responsive actions mapped to the attributes of the incoming message, as shown at block 644. For example, the message response system 20 compares the message attributes of the incoming message with the message attributes that are mapped to user actions. The message response system 20 prioritizes the responsive actions according to the scores assigned to the relationships between the user actions and the user actions, as shown at block 646. In an example, the message response system 20 only adds user actions corresponding to relationships that are assigned at least a predetermined threshold score value.

In an example, the message response system 20 scans an incoming or arriving message, and prioritizes a list of suggested user actions and schedule the user actions according to the corresponding mapping scores, thus recommending a user action. The user 10 can accept or dismiss the suggested user actions from the list, as shown at block 652. The message response system 20 keeps track of the user action(s) selected by the user 10 from the list and updates the scores assigned to the relationships of the user action(s) and the message attributes of the incoming message, as shown at block 654. Thus, the message response system 20 updates the mapping between the message attributes and the user actions, as shown at block 650. Accordingly, the message response system 20 strengthens the mapping with respect to the user preferences.

In another example, the message response system 20 is deployed with an initial mapping based on actions taken by one or more users in response to incoming messages with specific message attributes. The message response system 20 further tracks the actions taken by the user 10 and updates the initial mapping. Alternatively or in addition, the message response system 20 generates a second mapping specific to the user 10, which the message response system 20 uses for recommending user actions by the user 10.

In an example, the message response system 20 presents the list of recommended actions to the user 10 in response to an incoming message. In another example, the message response system 20 presents the list of recommended actions to the user 10 by sending a periodic message such as an email once or twice per day, or any other predetermined frequency. The periodic message may include a list of incoming messages from the multiple messaging services that the user 10 subscribes to, and a list of recommended user action for each received message since the previous such periodic message that has not been acted upon. In an example, the period message may be a workflow plan diagram with dates and times of accepted actions. For example, the periodic message may include a calendar view that identifies scheduled action items for the user 10 according to the received messages. For example, in response to an incoming message, the user action may be a creation of a meeting, a creation of a 'to-do' or a note item (such as a task item in IBM LOTUS™, MICROSOFT OUTLOOK™, EVERNOTE™ or any other task management tool).

Figure 7:
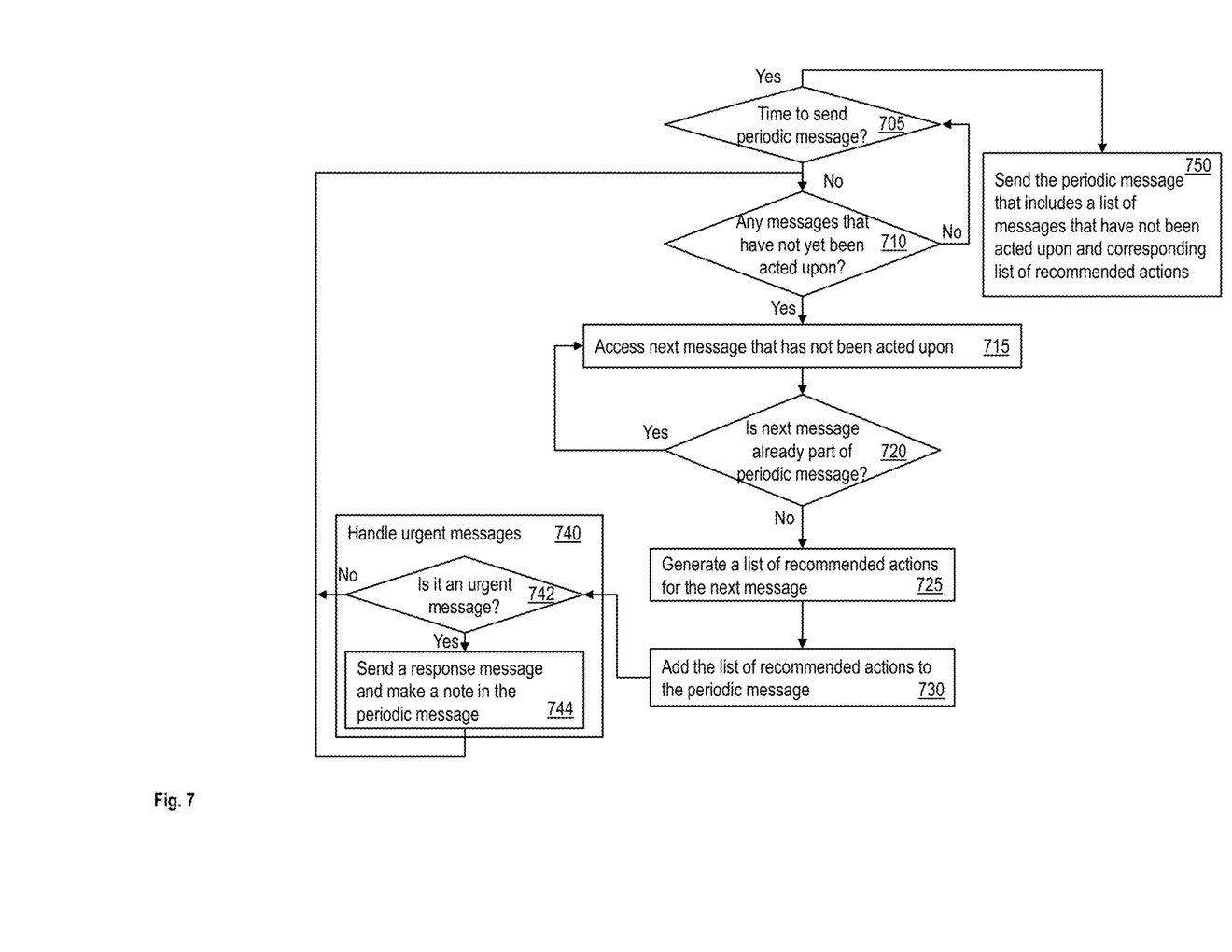
FIG. 7 illustrates a flowchart of an example method of presenting a periodic message with a list of recommended user actions for received messages in accordance with an embodiment.

FIG. 7 illustrates a flowchart of an example method of presenting a periodic message with a list of recommended user actions for received messages. The message response system 20 determines if it is time to send a periodic message, as shown at block 705. If it is not yet time to send the periodic message, the message response system checks if there are any messages that have not yet been acted upon, as shown at block 710. For example, the message response system 20 accesses the message servers 25 to identify messages that were received since the previous periodic message. In addition, the message response system 20 may identify messages that were received before the previous periodic message was sent, and yet not acted upon by the user 10. If there are no messages that the user 10 has not yet acted upon, the message response system 20 continues to wait for the time to send the periodic message. Else, the message response system 20 accesses a next message that the user 10 has not yet acted upon, as shown at bock 715. The message response system 20 further checks if the next message already is a part of the periodic message, as shown at block 720. If the message has been already added to the periodic message, the message response system 20 accesses another message. The message response system 20 generates a list of recommended actions for the next message and adds the next message and the corresponding list to the previous message, as shown at blocks 725 and 730.

In an example, the message response system 20 may additionally handle urgent messages that the user 10 has not yet acted upon, as shown at block 740. For example, the message response system identifies that the next message is urgent based on an extracted message attribute, such as a header or the text within the message, as shown at block 742. If the next message is not an urgent message, the message response system 20 continues to access another message. Else, the message response system 20 takes a predetermined action, such as sending a predetermined response message to the sender of the urgent message, as shown at block 744. Of course, in another example, the predetermined action may be different than or in addition to that illustrated. When it is time to send the periodic message, the message response system sends the periodic message that includes a list of messages that have not been acted upon and corresponding list of recommended actions, as shown at block 750. Thus, the message response system 20 generates and sends the periodic message to the user 10. The user 10 may select or dismiss a user action from the list of recommended actions for a received message from the periodic message. The user 10 reviews the periodic message, or the workflow plan, and edits the recommended user actions. For example, the user 10 may indicate that a recommended action has been completed, cancelled, or changed. The message response system 20 updates the mapping and the assigned scores accordingly.

In an example, the workflow plan created by the message response system 20 in response to an incoming message includes a work item that may include an estimate for a task duration, a due date of the task, a reminder for the task, or any other aspect associated with the task. The user 10 may edit such aspects, such as the estimate or the due date. The message response system 20 updates the user actions accordingly so that in a future iteration, the values used for a task item created are in line with the edited values.

In an example, the user 10 may instruct the message response system 20 to generate a list of recommended actions for any messages that the user 10 has not yet acted upon. In another example, the message response system 20 may be configured to generate the list of recommended actions in response to receipt of a new message. In another example, the message response system 20 may be configured to generate the list of recommended actions in response to the number of messages that the user 10 has not acted upon is above a predetermined threshold value. Other conditions may be used to trigger the message response system 20 to generate the list of recommended actions in other examples.

In an example, the message response system 20 selects an action to add to the list of recommended actions based on a location of receipt of the incoming message. For example, the message response system extracts a location at which a message is received as one of the message attributes and assigns and updates a score to a relationship between the location and the action the user 10 takes in response to the message. For example, the user 10 takes a specific action in response to receiving the message in the vicinity of the location. For example, the vicinity of a location may be an area within a predetermined distance from the location. For example, the user 10 may take a user action, such as sending a text message, in response to receipt of a message via any of the messaging services when the user 10 is at a predetermined location, such as at the office. Accordingly, the message response system assigns and updates a score of the relationship between the location and the user action of sending the text message, which in this case is higher than scores assigned to relationships between other attributes and user actions. Accordingly, the message response system 20, in response to receiving a new message when the user 10 is in the vicinity of the location, such as the office, selects sending a text message as an action to be added to the list of recommended actions.

In addition, since the response message system 20 has access to multimodal messaging services, the message response system 20 maps attributes of messages received via a first messaging service and actions taken by the user 10 on a second messaging service. For example, in response to receipt of an email message (via a first messaging client) from a specific sender X, the user 10 may typically, respond with a text message, or an instant messaging service (via a second messaging client). The message response system 20, in this case, creates a relationship between a combination of the message attributes {sender=X, messaging client=email} and {user action=send text message to X}. The message response system 20 further assigns and updates a score of the relationship each time the user 10 sends a text in response to an email from sender X. Accordingly, in response to an incoming email from X, the message response system 20 selects sending a text message (that is a message via a second messaging client/service) as an action in the list of recommended actions.

In an example, the list of recommended actions may include actions from a predetermined set of actions that the message response system 20 monitors. For example, the user actions may include initiation of a reply to a new message, creation of an entry in a calendar, deletion of the new message, creation of a note, archiving the new message, flagging the new message for a future action, and the like.

Accordingly, the technical solutions described herein provide a converged messaging system, which provides a list of recommended user actions to a user in response to receipt of a new message. The list of recommended user actions is based on the message attributes of the new message according to a mapping of message attributes to user actions by a user or a group of users, the mapping generated based on an archive of prior messages and corresponding user actions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method for action recommendation in a multimodal messaging system, the method comprising:
    generating a periodic recommended actions message that comprises a list of new incoming messages to which a user has not yet responded, the incoming messages are from multiple messaging services to which the user subscribes, and the periodic recommended actions message further comprises recommended actions for each incoming message from the list of incoming messages for the user, wherein generating the periodic recommended actions message comprises:
        determining the list of new incoming messages received by the user from the messaging services and to which the user has not responded;
        generating a list of recommended actions for each incoming message from the list of new incoming messages that is determined, generating the list of recommended actions comprises:
            accessing a prior message received by the user to which the user has responded;
            identifying a first set of attributes associated with the prior message;
            identifying a prior action selected by the user in response to the prior message;
            identifying a second set of attributes associated with a new message from the list of new incoming messages, the new message received via a first messaging client that is associated with a first messaging server;

generating the list of recommended actions to respond to the new message based on a comparison of the first set of attributes and the second set of attributes, the list of recommended actions comprising an action to respond to the new message via a second messaging client that is associated with a second messaging server, distinct from the first messaging client and the first messaging server; and adding the list of recommended actions in the periodic recommended actions message.

2. The computer implemented method of claim 1, wherein an attribute of a message, which is in the first set of attributes and the second set of attributes, is one of a sender of the message, a time of receipt of the message, a time of transmission of the message, a location of receipt of the message, and text within the message.

3. The computer implemented method of claim 1 further comprising, selecting an action to add to the list of recommended actions based on a location of receipt of the new message.

4. The computer implemented method of claim 3, wherein the action is selected based on said action taken by the user in response to the prior message, and the prior message being received by the user in vicinity of the location of receipt of the new message.

5. The computer implemented method of claim 1 further comprising, wherein the first messaging client is accessed via a first device and the second messaging client is accessed via a second device.

6. The computer implemented method of claim 5, wherein the action to respond to the new message using a first messaging client is selected based on the user responding to the prior message via the first client and the prior message being received via the second client.

7. The computer implemented method of claim 1, wherein the list of recommended actions is generated based on a mapping between an action taken by the user in response to a received message and attributes of the received message.

8. The computer implemented method of claim 7, further comprising:

receiving, from the user, a selection of an action from the list of recommended actions in response to the new message; and updating the mapping according to the selected action and the second set of attributes associated with the new message.

9. A response recommendation system comprising:
a memory; and
a processor configured to:
access an archive of prior messages received by a user;
identify a first set of attributes associated with each respective prior message from the archive;
identify one or more prior actions taken by the user in response to the each respective prior message;
determine a mapping between the first set of attributes that are identified and the prior actions taken by the user;
identify a second set of attributes associated with a new message directed to the user, the new message received via a first messaging client that is associated with a first messaging server;
generate a list of recommended actions in response to the new message based on the mapping and a comparison of the second set of message attributes of the new message with the first set of attributes, wherein the list of recommended actions comprises an action to respond to the new message via a second messaging client that is associated with a second messaging server, distinct from the first messaging client and the first messaging server; and
present the list of recommended actions to the user.

10. The system of claim 9, wherein the message attributes of a message comprise a sender of the message, a time of receipt of the message, a time of transmission of the message, a location of receipt of the message, and text within the message.

11. The system of claim 9, wherein the processor is further configured to:

receive, from the user, a selection of an action from the list of recommended actions in response to the new message; and update the mapping according to the selected action and the set of message attributes associated with the new message.

12. The system of claim 9, wherein the processor is further configured to, select an action to add to the list of recommended actions based on a location at which the new message is received being mapped to the action.

13. The system of claim 12, wherein the action is mapped to the location based on the action being taken in response to at least a predetermined number of prior messages from the archive being received in vicinity of the location.

14. The system of claim 9, wherein the archive of prior messages comprises prior messages received from a plurality of message servers.

15. The system of claim 9, wherein the archive of prior messages comprising prior messages that are received via a plurality of client devices.

16. The system of claim 9, wherein the list of recommended actions comprises at least one of: initiation of a reply to the new message, creation of an entry in a calendar, deletion of the new message, and creation of a note.

17. A computer program product for recommending actions in response to incoming messages, the computer product comprising a computer readable storage medium, the computer readable storage medium comprising computer executable instructions, wherein the computer readable storage medium comprises instructions to:

access an archive of prior messages received by a user;
identify a first set of attributes associated with each respective prior message from the archive;
identify one or more prior actions taken by the user in response to the each respective prior message;
determine a mapping between the first set of attributes that are identified and the prior actions taken by the user;
identify a second set of attributes associated with a new message directed to the user, the new message being received via a first messaging client that is associated with a first messaging server;
generate a list of recommended actions in response to the new message based on the mapping and the set of message attributes, wherein the list of recommended actions comprises an action to respond to the new message via a second messaging messaging client and the first messaging server; and
present the list of recommended actions to the user.

18. The computer program product of claim 17, wherein the computer readable medium further comprises instructions to:

receive, from the user, a selection of an action from the list of recommended actions in response to the new message; and update the mapping according to the selected action and the set of message attributes associated with the new message.

19. The computer program product of claim 17, wherein the computer readable medium further comprises instructions to, select an action to add to the list of recommended actions based on a location at which the new message is received being mapped to the action.

20. The computer program product of claim 19, wherein the action is mapped to the location based on the action being taken in response to at least a predetermined number of prior messages from the archive being received in vicinity of the location.

* * * * *